(12) United States Patent
Heitzmann et al.

(10) Patent No.: US 11,400,943 B2
(45) Date of Patent: Aug. 2, 2022

(54) ASSISTANCE IN DRIVING ON A FAST ROAD WITH CARRIAGEWAYS SEPARATED BY A SAFETY RAIL

(71) Applicant: Valeo Schalter und Sensoren GmbH, Bietigheim-Bissingen (DE)

(72) Inventors: Thomas Heitzmann, Créteil (FR); Thomas Liennard, Créteil (FR); Benazouz Bradai, Créteil (FR)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 597 days.

(21) Appl. No.: 16/336,679

(22) PCT Filed: Sep. 28, 2017

(86) PCT No.: PCT/EP2017/074710
§ 371 (c)(1),
(2) Date: Mar. 26, 2019

(87) PCT Pub. No.: WO2018/060379
PCT Pub. Date: Apr. 5, 2018

(65) Prior Publication Data
US 2021/0276563 A1 Sep. 9, 2021

(30) Foreign Application Priority Data
Sep. 28, 2016 (FR) .................... 1659239

(51) Int. Cl.
*B60W 40/06* (2012.01)
*G01S 17/931* (2020.01)
(Continued)

(52) U.S. Cl.
CPC ............ *B60W 40/06* (2013.01); *B60W 40/04* (2013.01); *B60W 50/0098* (2013.01);
(Continued)

(58) Field of Classification Search
CPC .. B60W 40/06; B60W 40/04; B60W 50/0098; B60W 2555/60;
(Continued)

(56) References Cited

U.S. PATENT DOCUMENTS 9,395,192 B1   7/2016 Silver et al.
9,779,314 B1 * 10/2017 Wendel .............. G06K 9/00825
(Continued)

FOREIGN PATENT DOCUMENTS

DE   102013006793 A1 * 10/2014 .............. B60Q 3/80
DE   202014006923 U1   11/2015

OTHER PUBLICATIONS

Machine translation of DE102013006793A1 (Year: 2014).*
(Continued)

*Primary Examiner* — Mahmoud S Ismail
*Assistant Examiner* — Gabriel Anfinrud
(74) *Attorney, Agent, or Firm* — Osha Bergman Watanabe & Burton LLP

(57) ABSTRACT

A method for assisting in the driving of a vehicle on a fast road with carriageways separated by a safety rail in which the presence of the safety rail is detected is disclosed. The safety rail is modelled from measurements performed continuously by at least one laser scanner sensor mounted on the motor vehicle, with the determination of a confidence index associated with the detection by the laser scanner sensor, an automatic driving mode is activated when the confidence index $I_{CONF}$ is above a confidence threshold. This mode is maintained as long as a current confidence index associated with the detection is above the confidence threshold, and this mode is deactivated when the current confidence index passes below said confidence threshold. The density of traffic in front of the motor vehicle is estimated from images captured by an embedded camera.

6 Claims, 3 Drawing Sheets

Figure 3:
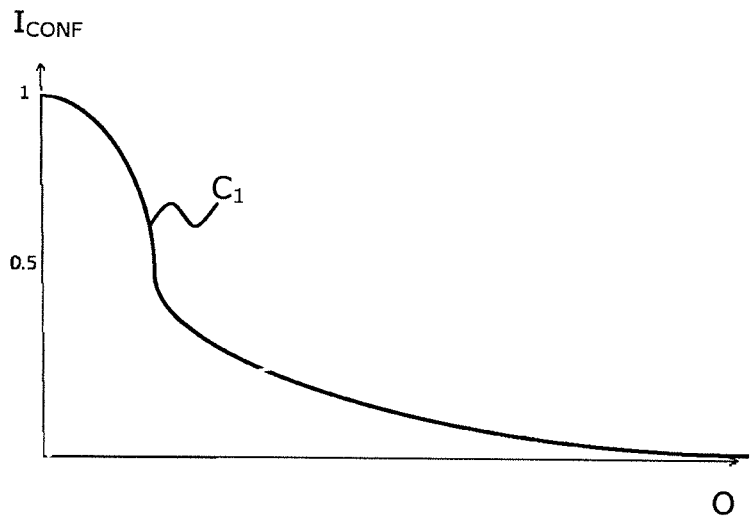

(51) Int. Cl.
*G01S 17/86* (2020.01)
*G01S 17/04* (2020.01)
*B60W 40/04* (2006.01)
*B60W 50/00* (2006.01)
*G01S 7/481* (2006.01)

(52) U.S. Cl.
CPC ............ *G01S 7/4814* (2013.01); *G01S 17/04* (2020.01); *G01S 17/86* (2020.01); *G01S 17/931* (2020.01); *B60W 2050/0095* (2013.01); *B60W 2420/42* (2013.01); *B60W 2420/62* (2013.01); *B60W 2552/50* (2020.02); *B60W 2554/406* (2020.02); *B60W 2555/60* (2020.02)

(58) Field of Classification Search
CPC ....... B60W 2554/406; B60W 2552/50; B60W 2050/0095; B60W 2420/42; B60W 2420/62; G01S 17/931; G01S 17/86; G01S 17/04; G01S 7/4814
See application file for complete search history.

(56) References Cited

U.S. PATENT DOCUMENTS

| | | | |
|---|---|---|---|
| 2002/0107637 A1 | 8/2002 | Okamura et al. | |
| 2002/0183906 A1* | 12/2002 | Ikeda | B62D 15/029 701/36 |
| 2005/0154503 A1* | 7/2005 | Jacobs | G05D 1/0242 701/1 |
| 2010/0097200 A1 | 4/2010 | Hilsebecher et al. | |
| 2014/0330479 A1 | 11/2014 | Dolgov et al. | |
| 2017/0045362 A1* | 2/2017 | Song | G01C 21/30 |

OTHER PUBLICATIONS

International Search Report and Written Opinion issued in corresponding Intenational Patent Application No. PCT/EP2017/074710, dated Dec. 12, 2017 (12 pages).

* cited by examiner

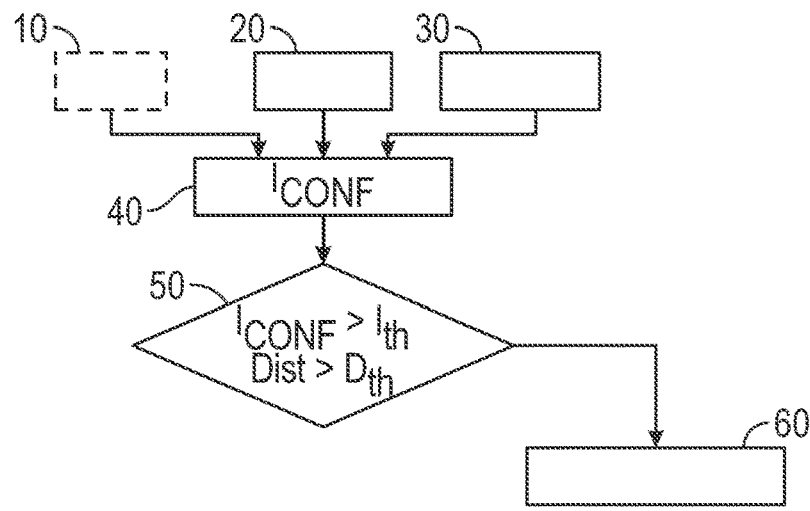
FIG. 1
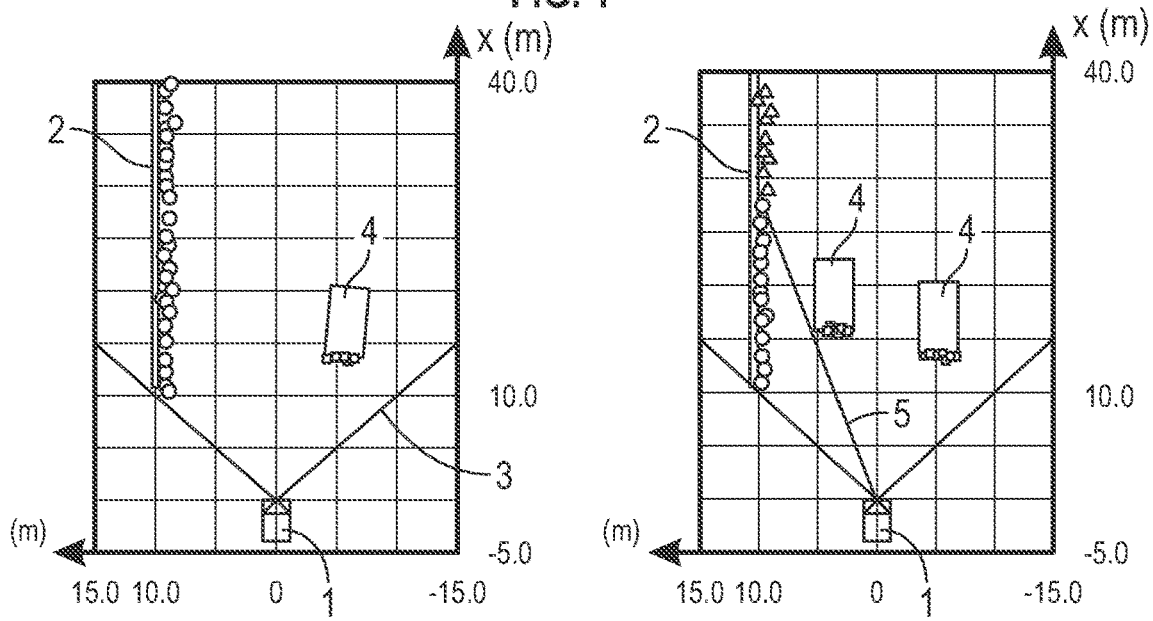
FIG. 2a
FIG. 2b
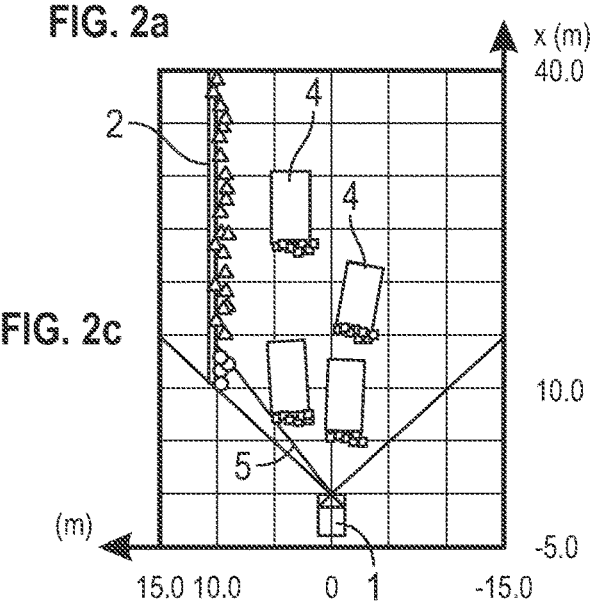
FIG. 2c

ASSISTANCE IN DRIVING ON A FAST ROAD WITH CARRIAGEWAYS SEPARATED BY A SAFETY RAIL

The present invention relates generally to motor vehicles, and more specifically to a method and a system for assisting in driving on a fast road with carriageways separated by a safety rail.

The driving assistance systems for vehicles combine various functionalities, in particular assistance in changing lane or LCC (acronym for Lane Change Control), speed regulation or ACC (acronym for Auto Cruise Control), or in the stopping and the restarting of the vehicle as a function of the traffic conditions and/or signals (lights, stop, give way, etc.).

Another general function thereof is to define the trajectory that the vehicle should follow and consequently make it possible to control the members controlling the direction of the vehicle and the braking system, for this trajectory to be effectively followed. The trajectory should be understood here within its mathematical definition, that is to say as being the set of successive positions that should be occupied by the motor vehicle over time. Thus, the assistance systems have to define not only the path to be taken, but also the speed profile to be observed. To do this, they use a lot of information on the immediate environment of the vehicle (presence of obstacles such as pedestrians, cycles, or other motorized vehicles, detection of traffic signs, road configuration, etc.), from various detection means using cameras, radars, lidars with which the vehicle is equipped, and information linked to the vehicle itself, such as its speed, its acceleration, its position given for example by a navigation system of GPS type. From this variety of information, a trajectory planning module included in the assistance system determines the trajectory to be followed.

The motor vehicle constructors and equipment manufacturers have recently become interested in a particular functionality for assisting in driving on a fast road such as a motorway in heavy traffic conditions. The aim of this particular assistance is to allow the vehicle to move in an automated way over suitable road sections, such as fast roads with separated carriageways. The system is envisaged for operating below a certain speed, typically of the order of 50-70 km/h, and primarily in congestion conditions, to allow the car to itself follow the traffic lanes, while adapting its rate to the traffic and to the regulatory speed. Such an automated driving mode does not require continuous supervision on the part of the driver. The latter can thus perform a secondary activity. During an automated driving phase, the system may nevertheless prompt the driver to retake control of his or her vehicle, in the case where it would for example be exiting a suitable road section or in case of faster traffic speed.

To perform such a functionality, the use of a navigation module, for example of GPS type, embedded in the vehicle, could seem sufficient since such a navigation module provides the attributes of the road currently being taken (in this particular case, the functional class and the speed limit of the road taken, making it possible to derive the type of road and in particular know whether the road being taken is a motorway or other road), attributes from which it would be possible to model the road context, and consequently allow the activation of the automated mode if the road is indeed a fast road of motorway type. Nevertheless, a navigation module on its own is not deemed sufficient in terms of safety because its information may include errors. Moreover, a navigation module is not always operational in a rolling situation.

Now, one way of recognizing that a vehicle is moving on a fast road of motorway type is the presence of a safety rail separating the carriageways (reverse traffic lanes) of this fast road.

In a known system of this type currently being developed and trialled, and whose operation is schematically represented in FIG. 1, the activation of the automatic driving mode on a fast road can be authorized (step 60 in FIG. 1) when it is known, via a navigation module 10, that the road is indeed a fast road and that there has been success in detecting, with a sufficient confidence index, the presence of the safety rail on this fast road. More specifically, the measurements supplied continuously by a laser scanner sensor 20 embedded on the vehicle are used to detect the presence of the safety rail, and model this rail. Furthermore, a detection of obstacles, such as third-party vehicles situated in front of the vehicle, is performed in parallel from images captured by a front-end camera 30 embedded also on the vehicle.

To illustrate the principle of the detection of the safety rail, FIGS. 2a, 2b and 2c illustrate, by way of example, the points of impact of the laser scanner sensor 20 obtained for different situations of rolling of a vehicle 1 equipped with the above system, this vehicle 1 moving on a motorway with a separating safety rail 2. In the three figures, the cone 3 illustrates the zone of observation of the laser scanner sensor 20. The third-party vehicle 4 represents the obstacles, typically third-party vehicles, present in the zone in front of the vehicle 1, detected also by virtue of the images captured by the front-end camera 30. In the case of FIG. 2a (light traffic in front of the vehicle 1), it is observed that the presence of the third-party vehicle 4 is not a hindrance for determining the presence of the safety rail 2. The set of the points of impact situated along this rail, represented in the form of circles, will be used in the modelling of the rail, for example by using the Ransac algorithm (Ransac being an abbreviation for RANdom SAmple Consensus) or equivalent, making it possible to determine a straight line which is best fitted to the points of impact obtained. To discriminate the measurements to be used for the modelling of the rail, between the points of impact situated along the rail 2 and those resulting from the presence of a third-party vehicle 4 (represented by squares), the obstacle detection information deriving from the processing of the images captured by the front-end camera 30 is advantageously used.

FIGS. 2b and 2c on the other hand show cases where the traffic in front of the vehicle 1 is much heavier, with in particular the presence of third-party vehicles 4 obstructing the action of the laser scanner 20, particularly on the safety rail 2. Thus, all the points of impact represented in the form of triangles along the rail 2 above the straight line 5 are in practice not available and cannot therefore be used in the detection and the modelling of the safety rail. It is therefore intuitively known that the detection of a safety rail by the laser scanner sensor 20 is less reliable in the case of dense traffic, because of a smaller number of points of impact available for the modelling of the detected safety rail.

Thus, with the above system, and as schematically represented in FIG. 1, provision is made for a step 40 of detecting presence of and modelling the safety rail 2, performed from measurements performed continuously by at least the laser scanner sensor 20, to comprise the determination of a confidence index $I_{CONF}$ associated with the detection of the rail by the laser scanner sensor 20.

As described previously, this confidence index $I_{CONF}$ will be variable as a function of the traffic conditions in front of the vehicle, these traffic conditions being able to be modelled by a parameter O representative of the number and/or of the position of the obstacles detected in front of the vehicle 1, in other words of an occupancy grid in front of the vehicle 1. The curve $C_1$ of FIG. 3 illustrates an example of variations of this confidence index $I_{CONF}$ as a function of the parameter O.

This confidence index, recalculated in real time, is compared in a step 50 to a confidence threshold $I_{th}$, such that it is possible to authorize the activation of the automatic driving mode (step 60) when the confidence index $I_{CONF}$ is above the confidence threshold $I_{th}$ for at least a predefined time corresponding to a minimum rolling distance $D_{th}$ travelled by the motor vehicle 1.

The system also provides for the automatic driving mode to be maintained as long as a current confidence index associated with the detection is above the confidence threshold $I_{th}$ and for the automatic driving mode to be deactivated when the current confidence index passes below the confidence threshold.

One of the problems posed by the above system lies in the fact that, when the vehicle 1 has just been authorized to switch to automatic driving mode by virtue of the detection of the safety rail associated with a sufficient confidence index, the traffic conditions may happen to change very rapidly, in particular through an increase in the traffic. In some cases, that may rapidly cause the system to deactivate the automatic driving mode, and do so even though the functionality is supposed to remain active in congestion conditions.

The aim of the present invention is to address this particular problem.

To do this, the subject of the invention is a method for assisting in the driving of a motor vehicle on a fast road with carriageways separated by a safety rail comprising:

a step of detecting presence of and modelling the safety rail from measurements performed continuously by at least one laser scanner sensor mounted on the motor vehicle, comprising the determination of a confidence index $I_{CONF}$ associated with the detection by the laser scanner sensor;

a step of activating an automatic driving mode when said confidence index $I_{CONF}$ is above a confidence threshold $I_{th}$ for at least a predefined time corresponding to a minimum rolling distance $D_{th}$ travelled by the motor vehicle;

a step of maintaining said automatic driving mode as long as a current confidence index associated with the detection is above said confidence threshold $I_{th}$; and a step of deactivating said automatic driving mode when the current confidence index passes below said confidence threshold;

said method also comprising a step of estimating the density of traffic in front of the motor vehicle from images captured by a camera embedded on said motor vehicle, a method in which, after activation of said automatic driving mode, said current confidence index taken into account in the deactivation and maintaining steps is a function of a combination of the confidence index $I_{CONF}$ associated with the detection of presence of the safety rail and of the estimated traffic density.

In addition to the main features which have just been mentioned in the preceding paragraph, the method according to the invention can have one or more additional features out of the following:

the confidence index $I_{CONF}$ associated with the detection by the laser scanner sensor is advantageously determined as a function of the number and/or of the position of objects detected in front of the motor vehicle from the images captured by the camera;

the modelling of the safety rail preferably uses the measurements performed continuously by the laser scanner sensor, from which have been removed the measurements coinciding with objects detected in front of the motor vehicle from the images captured by the camera.

Another subject of the invention is a system for assisting in the driving of a motor vehicle on a fast road with carriageways separated by a safety rail comprising a laser scanner sensor and a camera embedded on said motor vehicle, said system being configured to implement the following steps:

a step of detecting presence of and modelling the safety rail from measurements performed continuously by at least said laser scanner sensor, comprising the determination of a confidence index $I_{CONF}$ associated with the detection by the laser scanner sensor;

a step of activating an automatic driving mode when said confidence index $I_{CONF}$ is above a confidence threshold $I_{th}$ for at least a predefined time corresponding to a minimum rolling distance $D_{th}$ travelled by the motor vehicle;

a step of maintaining said automatic driving mode as long as a current confidence index associated with the detection is above said confidence threshold $I_{th}$;

a step of deactivating said automatic driving mode when the current confidence index passes below said confidence threshold; and a step of estimating the traffic density in front of the motor vehicle from images captured by said camera, a system in which, after activation of said automatic driving mode, said current confidence index taken into account in the deactivation and maintaining steps is a function of a combination of the confidence index $I_{CONF}$ associated with the detection of presence of the safety rail and of the estimated traffic density.

Figure 4:
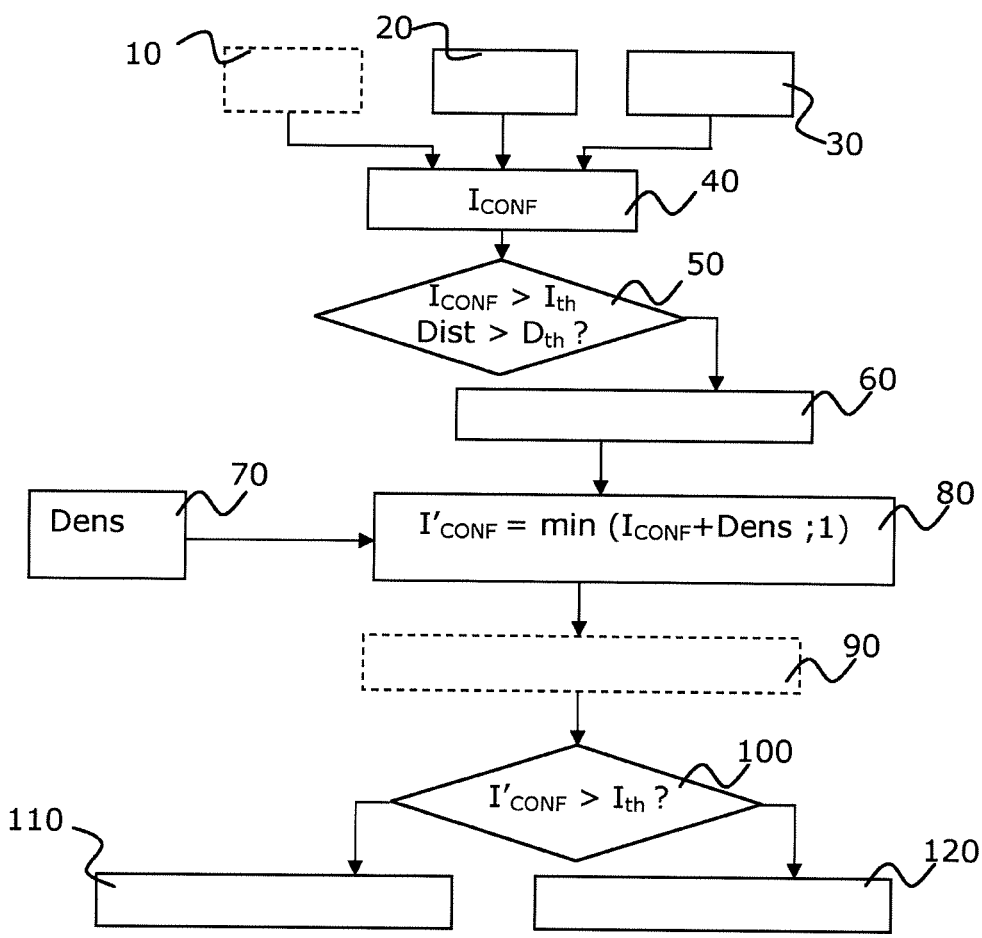
Figure 5:
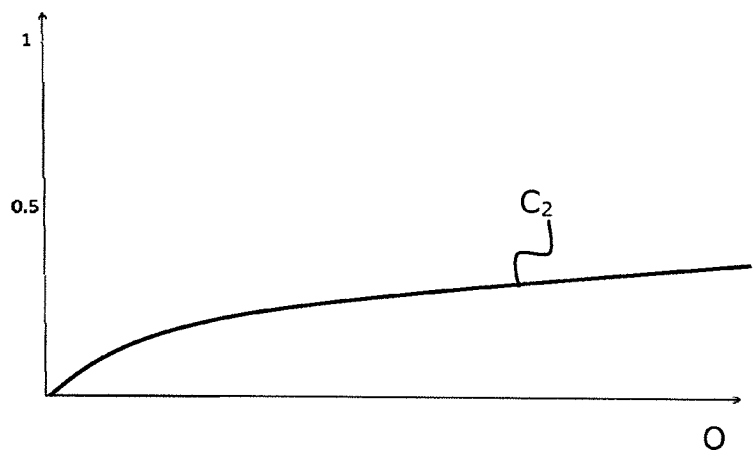
Figure 6:
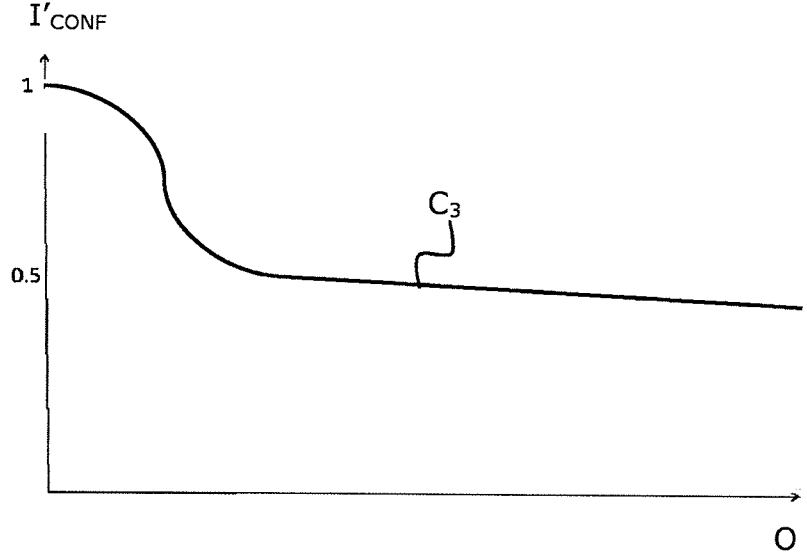

The invention will be better understood on reading the following description, given with reference to the attached figures, in which:

FIG. 1, already described, describes possible steps for the activation of an automatic driving mode on detection of the presence of a safety rail separating the carriageways of a fast road;

FIGS. 2a, 2b and 2c, described previously, illustrate three examples of points of impact obtained by a laser scanner sensor in three different rolling situations;

FIG. 3 schematically represents the rate of the variations of a confidence index associated with the detection of a safety rail, as a function of the occupancy of the environment situated in front of the vehicle;

FIG. 4 illustrates steps of a driving assistance method in a possible implementation conforming with the invention;

FIG. 5 schematically represents the rate of the variations of the traffic density as a function of the occupancy of the environment situated in front of the vehicle;

FIG. 6 schematically represents the rate of the variations of a current confidence index associated with the detection of a rail and calculated according to the principles of the invention.

Referring to FIG. 4, and as already described previously in relation to FIG. 1, a driving assistance system for a motor vehicle taking a fast road with carriageways separated by a safety rail comprises a laser scanner sensor 20 and a front-end camera 30 embedded on the vehicle. The system also preferably uses information supplied by a navigation module 10, for example of GPS type, in particular the attributes delivered by such a navigation module 10 making it possible to know that the vehicle is indeed on a fast road with carriageways separated by a safety rail.

All these data will be able to be combined in a step 40 in order to allow a detection of presence and a modelling of the safety rail, a detection with which it is possible to associate a confidence index $I_{CONF}$. A formalism of the Dempster-Shafer type can be used, or any other learning algorithm such as Adaboost or SVM (acronym for Support Vector Machine), to deliver safety rail detection information with its associated confidence index.

The modelling of the safety rail 2 uses the measurements performed by the laser scanner sensor 20 (points of impact), from which have preferably been removed the measurements coinciding with objects detected in front of the motor vehicle from the images captured by the camera. For this modelling, the abovementioned Ransac algorithm can be used or any other equivalent algorithm that makes it possible to determine a straight line which is best fitted to the points of impact retained.

The confidence index $I_{CONF}$ associated with the detection by the laser scanner sensor 20 is advantageously determined as varying as a function of the number and/or of the position of objects detected in front of the motor vehicle from the images captured by the camera (see curve $C_1$ of FIG. 3 which gives an example of variations of this confidence index $I_{CONF}$ as a function of the parameter O representative of the number and/or of the position of the obstacles detected by the camera in front of the vehicle). The confidence index can also take into account other information resulting from the processing of images, for example the identification of marking lines on the ground making it possible to know if the vehicle is moving on a lane more or less close to the safety rail.

The activation of the driving mode is triggered by the system when the confidence index $I_{CONF}$ is above a confidence threshold $I_{th}$ for at least a predefined time corresponding to a minimum rolling distance $D_{th}$ travelled by the motor vehicle (steps 50 and 60).

Once this mode is activated, to avoid an unwanted deactivation even though the vehicle is still on the fast road with traffic conditions intensifying, provision is made to complement the processing with the following steps:

an estimation (step 70) of the density of traffic in front of the motor vehicle is performed from the images captured by the front-end camera 30, and more particularly the third-party vehicles detected by the processing of these images. Several parameters can be used, alone or in combination, to establish an estimation, denoted Dens hereinbelow and in the figures, of the traffic density:

a first parameter $P_1$ relates to the observation of the environment of the vehicle, linked to the presence of third-party vehicles in front of the vehicle 1. This first parameter is for example a function of the number of third-party vehicles detected over a given time window (for example for a minute) by using the images from the front-end camera 30, of an estimation of the overall average speed of these third-party vehicles, and of the speed limit on the fast road (obtained via the navigation module 10).

A second parameter $P_2$ relates to the movement behaviour of the vehicle 1, a function for example of its average speed observed over a given time window (for example for a minute), of the number of positive or negative accelerations observed, and of the speed limit on the fast road (obtained via the navigation module 10).

A third possible parameter $P_3$ relates to the movement behaviour of the vehicle 1 relative to the third-party vehicle closest to the vehicle 1. This third parameter is a function, for example, of the average speed of the vehicle 1 observed over a given time window (for example for a minute), of the number of positive or negative accelerations observed, of the average distance between the vehicle 1 and the closest third-party vehicle, and of the speed limit on the fast road (obtained via the navigation module 10).

Other parameters can be envisaged, such as, in the case where some third-party vehicles detected are two-wheel vehicles, a parameter $P_4$ relating to the behaviour of the two-wheel vehicles relative to the third-party vehicles detected, in particular a comparison of the speeds of these two-wheel vehicles with those of the third-party vehicles.

The estimation Dens of the traffic density can then be obtained from a weighted sum of the different parameters used, for example according to the equation:

$$\text{Dens} = \frac{\sum_{k=1}^{4} \alpha_k P_k}{\sum_{k=1}^{4} \alpha_k}$$

in which $\alpha_k$ represents the weighting coefficient associated with each parameter $P_k$.

The curve $C_2$ represented in FIG. 5 illustrates the variations of the traffic density Dens as a function of the parameter O.

At the end of the step 70, the estimated traffic density is used in the calculation of a new confidence index $I'_{CONF}$ associated with the detection of the safety rail, which is a function of a combination of the confidence index $I_{CONF}$ associated with the detection of presence of the safety rail and of the estimated traffic density.

As an example, the combination of the confidence index $I_{CONF}$ associated with the detection of presence of the safety rail and of the estimated traffic density is a sum, which can be formulated mathematically by the expression $$I'_{CONF} = \min(I_{CONF} + \text{Dens}; 1)$$

In other words, because it is already known that a safety rail has been detected with a sufficient confidence index, and that consequently the automatic mode has been activated (step 60), the value of the confidence index is increased to avoid a premature deactivation of the automatic driving mode due to an increase in traffic density.

The confidence index $I'_{CONF}$ calculated in the step 80 can possibly, in a step 90, be reduced by a value taking into account the distance travelled by the motor vehicle 1 during which the confidence index $I_{CONF}$ is low.

It is this new value of the confidence index $I'_{CONF}$ which is taken into account in the comparison (step 100) with the confidence threshold $I_{th}$ to decide whether the automatic driving mode can be maintained (step 120) or, on the contrary, be deactivated (step 110) depending on whether the value of the confidence index $I'_{CONF}$ is above or below the confidence threshold.

The curve $C_3$ represented in FIG. 3 illustrates the variations of the confidence index $I'_{CONF}$ as a function of the parameter O, resulting from the sum of the curves $C_1$ and $C_2$. By comparing with the curve $C_1$ of FIG. 3, it is observed that, by taking into account the estimation Dens of the traffic density in the calculation of the confidence index, a higher value of this confidence is maintained when the traffic intensifies, thus reducing the risk of an unwanted deactivation of the automatic driving mode.

When the traffic once again becomes fluid, two possible cases can arise: either the detection of the safety rail is associated with a sufficient confidence index, such that the automatic driving mode will be maintained, or the confidence index becomes too low and leads to the deactivation of the automatic driving mode.

Obviously, other conditions independent of the calculation of I'$_{CONF}$ may require an immediate deactivation of the automatic driving mode, such as the detection by the camera that the vehicle is crossing an exit line, entering a town or the presence of a traffic light, or the fact that the navigation predicts a context unfavourable to that of a road with separated carriageway.

The invention claimed is:

1. A method for assisting in the driving of a motor vehicle on a fast road with carriageways separated by a safety rail comprising:
    detecting the presence of and modelling the safety rail from measurements performed continuously by at least one laser scanner sensor mounted on the motor vehicle, comprising determining a confidence index associated with the detection by the laser scanner sensor;
    activating an automatic driving mode when said confidence index is above a confidence threshold for at least a predefined time corresponding to a minimum rolling distance travelled by the motor vehicle;
    maintaining said automatic driving mode as long as a current confidence index associated with the detection is above said confidence threshold; deactivating said automatic driving mode when the current confidence index passes below said confidence threshold; and
    estimating a density of traffic in front of the motor vehicle from images captured by a camera embedded on said motor vehicle, wherein said confidence index is negatively correlated to the density of traffic, and
    wherein after the activating activation of said automatic driving mode, said current confidence index, which is taken into account in deactivating deactivation and maintaining said automatic driving model is a function of a combination of the confidence index associated with the detection of the presence of the safety rail and of the estimated traffic density,
    wherein the current confidence index is calculated as a sum of the confidence index and the estimated traffic density.

2. The method according to claim 1, wherein the confidence index associated with the detection by the laser scanner sensor is determined as a function of a number and a position of objects detected in front of the motor vehicle from the images captured by the camera.

3. The method according to claim 1, wherein the modelling of the safety rail uses the measurements performed continuously by the laser scanner sensor, from which measurements coinciding with objects detected in front of the motor vehicle from the images captured by the camera are removed.

4. The method according to claim 1, wherein, after the activating of said automatic driving mode, the current confidence index is greater than or equal to the confidence index.

5. A system for assisting in the driving of a motor vehicle on a fast road with carriageways separated by a safety rail, the system comprising:
    a laser scanner sensor; and
    a camera embedded on said motor vehicle, said system being configured to:
    detect the presence of and modelling the safety rail from measurements performed continuously by at least said laser scanner sensor, comprising the determination of a confidence index associated with the detection by the laser scanner;
    activate an automatic driving mode when said confidence index is above a confidence threshold for at least a predefined time corresponding to a minimum rolling distance travelled by the motor vehicle;
    maintain said automatic driving mode as long as a current confidence index associated with the detection is above said confidence threshold;
    deactivate said automatic driving mode when the current confidence index passes below said confidence threshold; and
    estimate a density of traffic in front of the motor vehicle from images captured by said camera, wherein said confidence index is negatively correlated to the density of traffic, and
    wherein, after activation of said automatic driving mode, said current confidence index, which is taken into account in the deactivating and maintaining of said automatic driving mode, is a function of a sum of the confidence index associated with the detection of the presence of the safety rail and of the estimated traffic density,
    wherein the current confidence index is calculated as a sum of the confidence index and the estimated traffic density.

6. The system according to claim 5, wherein, after the activation of said automatic driving mode, the current confidence index is greater than or equal to the confidence index.

* * * * *